Patented July 15, 1947

2,423,949

UNITED STATES PATENT OFFICE 2,423,949

CONTROLLED CATALYTIC PHOTOCHEMICAL OXIDATION OF ORGANIC COMPOUNDS

Frederick F. Rust and William E. Vaughan, Berkeley, Calif., assignors to Shell Development Company, San Francisco, Calif., a corporation of Delaware No Drawing. Application January 30, 1943, Serial No. 474,223

13 Claims. (Cl. 204—162)

This invention relates to the controlled non-explosive oxidation of organic compounds containing one or more replaceable hydrogen atoms. In one of its more specific embodiments the invention pertains to a novel method of effecting the catalytic oxidation of such organic compounds to produce high yields of carboxylic acids, ketones, and/or organic peroxides having the same number of carbon atoms per molecule as the primary starting material treated.

It is known that various hydrocarbons and their derivatives may be oxidized by subjecting them to the action of oxygen or other oxidizing substances both in the presence and in the absence of various catalysts. As a general rule most, if not all of the oxidations, when effected in accordance with the previously known processes, result in considerable decomposition of the starting organic material, i. e., cleavage of the carbon-to-carbon bonds of such material. Also the products of reaction of such oxidations contain various percentages of compounds which have been oxidized to a greater or lesser extent. For instance, the catalytic oxidation of paraffinic hydrocarbons in accordance with the teachings of the prior art usually form mixtures containing various percentages of carbon monoxide, carbon dioxide, olefins, water, as well as some aldehydes, alcohols, acetals, esters, ketones, and other oxygenated compounds. Similarly the catalytic oxidation of aromatic hydrocarbons, e.g., toluene, in accordance with the teachings of the prior art frequently forms mixtures containing various percentages of saturated and unsaturated hydrocarbons as well as saturated and unsaturated aliphatic and aromatic aldehydes, ketones, lactones, alcohols, and other oxygenated compounds such as carbonic acid. Furthermore, these various oxygenated compounds formed during the oxidation of the hydrocarbons according to the teachings of the prior art usually contain varied numbers of carbon atoms per molecule due to carbon-to-carbon bond scission, as well as to other side reactions such as polymerization, condensation, and the like. Although most of the oxygenated organic compounds formed as a result of partial oxidations of hydrocarbons, as well as of their organic derivatives, are generally more valuable than the primary materials subjected to the oxidation reaction, the subsequent fractions of the resulting complex reaction mixtures and the separate recovery of the individual compounds therefrom are frequently very difficult, if not commercially impossible. At least, such subsequent treatments greatly increase the cost of the final product or products.

It is also frequently desirable to obtain reaction products which predominate in carboxylic acids, peroxides and/or ketones rather than complex mixtures containing these compounds together with large amounts of other oxygenated compounds such as carbon dioxide aldehydes, alcohols and lactones which may or may not have the same number of carbon atoms per molecule as the starting material. Also, it is usually important or at least desirable to obtain such oxygenated compounds having the same number of carbon atoms per molecule as the starting organic material. In all such cases the known methods of partial oxidation of hydrocarbons, whether they be effected catalytically or non-catalytically, are less satisfactory because of the partial or complete decomposition of the starting materials to form carbon and compounds containing fewer carbon atoms per molecule, as well as due to the formation of complete mixtures of compounds which are oxygenated to a greater or lesser degree.

It has been discovered that the above and other defects of the prior art may be avoided or at least greatly diminished by subjecting organic compounds having at least one replaceable hydrogen atom to a partial and controlled oxidation in the presence of hydrogen bromide employed as a catalyst. More specifically stated, it has been discovered that the above-mentioned and hereinbelow more fully described organic compounds may be subjected to a controlled non-explosive oxidation in the presence of a catalyst consisting of or comprising hydrogen bromide, to produce high yields of desirable carboxylic acids, organic peroxides and/or ketones containing the same number of carbon atoms as the starting organic material thus subjected to the oxidation. For instance, the United States patent application Serial No. 474,220, filed January 30, 1943, discloses and claims a process for the controlled partial and non-explosive oxidation of aliphatic and particularly saturated aliphatic hydrocarbons, and of their products of partial halogenation, to produce carboxylic acids and/or ketones having the same number of carbon atoms per molecule as the starting material treated. In accordance with the process disclosed and claimed in said application this oxidation is effected by subjecting the saturated organic materials such as ethane, propane and butane, as well as their products of halo-substitution, to the action of oxygen at an elevated temperature which is however below that at which spontaneous combustion occurs, and in the presence of a catalyst comprising or consisting of hydrogen bromide, which may be introduced into the reaction zone as such or which may be formed in situ. Also, United States patent application Serial No. 474,221, filed January 30, 1943, covers a process for the controlled non-explosive oxidation of aromatic hydrocarbons and particularly of alkylated aromatic hydrocarbons to produce the corresponding substituted phenols, aromatic carboxylic acids, organic peroxides, and/or ketones having the same number of carbon atoms per molecule as the starting material, this oxidation being effected by subjecting the mentioned aryl or aralkyl hydrocarbons, or their partially halogenated derivatives, to the action of oxygen, at an elevated temperature, and preferably above about 100° C., but below the temperature capable of causing spontaneous combustion, and in the presence of hydrogen bromide employed as the catalyst. United States patent application Serial No. 474,222, filed January 30, 1943, now U. S. Patent 2,369,181, discloses and claims a similar process for the production of certain predetermined oxygenated products by the controlled catalytic oxidation under non-explosive conditions of alicyclic hydrocarbons and of their halogenated derivatives, while United States patent application Serial No. 474,224, filed January 30, 1943, now U. S. Patent 2,395,523, covers a process for the production of novel organic peroxides by the controlled oxidation of iso-paraffins such as isobutane. A similar process for the production of unsaturated organic compounds by the controlled oxidation of unsaturated hydrocarbons is claimed in United States patent application Serial No. 480,862, now U. S. Patent 2,369,182. In all these cases the controlled oxidation is effected in the presence of a catalyst consisting of or comprising hydrogen bromide which as stated may be introduced as such into the reaction zone or formed in situ under the operating conditions employed.

The above-outlined inventions are predicated on the discovery that the presence of hydrogen bromide, during the oxidation of the above-mentioned and hereinbelow more fully described organic compounds, controls the oxidation reaction so that the oxidation occurs on the carbon atom or atoms to which a halogen atom, e. g., a bromine atom, would normally attach itself if the starting material were subjected to a halo-substitution reaction. Also, it appears that the presence of the hydrogen bromide, besides retarding the explosion or complete combustion of the organic starting material, has the effect of inhibiting the decomposition of the carbon structure of such organic starting material, so that the resultant oxygenated compound or compounds contain the same number of carbon atoms per molecule as the starting material, or as in the case of certain organic peroxides contain twice the number of carbon atoms per molecule as are present in the starting material treated.

It has been further discovered that the catalytic non-explosive oxidation of organic compounds, and particularly of the group of organic compounds described more fully hereinbelow, may be effected by subjecting such organic starting materials, under the defined temperature and pressure conditions, to the action of oxygen in the presence of the afore-mentioned hydrogen halide catalyst and under the deliberate influence of ultra-violet radiations particularly those having wave-lengths below about 2900 to 3000 Angstrom units. As will be pointed out hereinbelow and particularly in the examples, the employment of ultra-violet radiations during the catalytic oxidation of the organic starting materials in the presence of hydrogen bromide, greatly increases the field of the desired oxygenated products and increases the rate of conversion even in the cases where the reaction is effected at temperatures which are considerable below those employed for similar controlled catalytic oxidations effected in the dark, i. e., in the absence of deliverate illumination with ultra-violet rays of wave-lengths below about 2900 to 3000 Angstrom units. As will be pointed out below, the use of ultra-violet radiations during the controlled non-explosive oxidation reactions necessitates the use of special equipment which is capable of transmitting rays of the defined low wave lengths. In other words, it is necessary to employ reaction vessels and/or lamps of quartz and other suitable materials, e. g. calcium fluoride, which are capable of transmitting photo-chemically active radiations capable of dissociating the reactants, recation products and/or catalyst. In the case of hydrogen bromide catalyst these radiations are below about 2900 to 3000 Angstrom units, while in the case of bromine the upper limit is about 5100 Angstrom units.

The present process is applicable to the oxidation of all organic compounds which contain at least one replaceable hydrogen atom, and the process is particularly adapted to the controlled oxidation of aliphatic hydrocarbons, particularly saturated aliphatic hydrocarbons, as well as of aromatic hydrocarbons, alkylated aromatic hydrocarbons, alicyclic hydrocarbons which may or may not contain one or more saturated or unsaturated aliphatic side chains, as well as of their derivatives such as products of their partial halo-substitution. Also, various other organic derivatives, e. g., nitriles, ketones, etc., fall within the class of compounds which may be employed as the primary material. For example, methyl ethyl ketone may be readily oxidized according to the present process to produce diacetyl.

Representative organic compounds of the class which may be oxidized in accordance with the process of the invention include the saturated aliphatic hydrocarbons, such as ethane, propane, n-butane, iso-butane, n-pentane, isopentane, the straight and branched chain hexanes, heptanes, octanes, nonanes and the like; the alicyclic hydrocarbons as cyclopropane, cyclobutane, cyclopentane, cyclohexane, the higher homologues thereof, and the alkylated cycloparaffins such as methyl cyclopentane, methyl cyclohexane, and the like; aryl and aralkyl hydrocarbons, such as benzene, naphthalene, toluene, xylenes, ethyl benzene, hemimellitene, mesitylene, n-propyl benzene, tertiary butyl benzene, di-phenyl methane, cymene, durene, and the like; the partially halo-substituted normal and branched chain saturated aliphatic, alicyclic and aromatic hydrocarbons, such as ethyl chloride, di-chloro ethane, mono- and di-chlorinated propanes, dibromo propanes, mono-chloro butanes, mono-bromo butanes, di-chloro butanes, mono-chloro cyclopentane, benzyl chloride, benzyl bromide, and their homologues and analogues. Other derivatives of the above defined class of hydrocarbons also fall within the class of compounds which may be employed as the primary material. The organic compounds which contain an aliphatic radical, such as a methyl or an ethyl radical, and particularly the lower homologues of organic compounds having one or more substituted or unsubstituted alkyl radicals are especially suitable as the starting materials which may be oxidized in accordance with the process of the present invention.

It was stated above that the slow (i. e., non-explosive) controlled oxidation of the above-outlined class of organic compounds is effected in accordance with the present process at temperatures which are below those at which spontaneous combustion or substantial decomposition of the carbon structure occurs. This upper temperature limit will depend at least in part on the specific organic substance to be oxidized, the proportions of the organic substances, oxygen and hydrogen bromide present in the mixture subjected to the elevated temperatures, and the presence or absence of ultra-violet radiations during the reaction. Generally speaking, this upper temperature limit is in the neighborhood of between about 200° C. and 225° C. However, some of the more stable organic compounds of the defined class may be heated together with oxygen and hydrogen bromide to higher temperatures, such as about 250° C., particularly in the presence of inert diluents, without causing the mixture to decompose with the concurrent formation of high yields of carbon. In this connection it is to be noted that excessively high temperatures, even though they are below the explosive region, should be avoided because of certain undesirable side reactions, such as the excessive conversion of the hydrogen bromide to organic bromides. Although this in itself is not detrimental because of the fact that these organic bromides may be treated in accordance with the present invention to form hydrogen bromide and oxygenated hydrocarbons which are free from bromine (so that in effect at least a portion of the hydrogen bromide originally employed as the catalyst is thus regenerated and may be reused), the excessive formation of the organic bromides during the controlled oxidation of a given organic compound, particularly of a given hydrocarbon, is undesirable because this decreases the catalyst concentration and therefore may affect the yield or output of the desired oxygenated product or products. Although, as stated, the upper temperature limit is generally in the neighborhood of 200° C. to 225° C. this temperature may be raised above this limit particuarly when shorter contact periods and/or relatively more stable compounds are employed. On the other hand, some of the more readily oxidizable compounds may be economically oxidized according to the present process at lower temperatures, such as between about 150° C. and about 175° C., particularly when the reaction is effected under the deliberate influence of ultra-violet radiations, i. e., radiations predominating in wave-lengths of below about 2900 to 3000 Angstrom units. Other conditions being equal a further decrease in the operating temperature generally decreases the output of the product per unit of time so that at temperatures which are materially below about 100° C. the controlled oxidation in the presence of hydrogen bromide, or of substances capable of yielding it under the operating conditions, may become uneconomical even when the reaction is effected under the deliberate influence of ultra-violet radiations.

The oxidation reaction may be effected in the liquid or vapor phase, or in a two-phase liquid-vapor system. Since it is difficult to maintain a desirable relatively high oxygen concentration when the reaction is conducted in the liquid phase, it is generally preferable to effect the oxidation according to the present invention in the vapor phase. Some of the relatively higher boiling compounds cannot be effectively maintained in the vapor phase and in contact with sufficient concentrations of oxygen and of the hydrogen bromide without causing the spontaneous combustion of such a mixture. The oxidation of such organic compounds may be readily effected in the presence of inert diluents or carriers, such as steam, nitrogen, carbon dioxide, and even methane, which latter is relatively stable at the temperatures at which the above-mentioned organic compounds may be oxidized according to the present invention. Of the above diluents or carriers the use of steam is believed to be most advantageous because the hydrogen bromide, may then be removed from the reaction mixture as an overhead fraction in the form of its constant boiling mixture of hydrogen bromide and water.

The oxidation reaction described herein may be effected in the dark, i. e., in the absence of ultra-violet radiations, when the mixture of the specified organic material and of oxygen is subjected to the action of hydrogen bromide at the non-explosive temperatures mentioned above. However, the use of ultra-violet radiations greatly increases the rate of reaction and promotes the formation of the desired oxygenated products at relatively lower temperatures even when using lower hydrogen bromide concentrations. Although the reaction described herein may be promoted by using the whole range of ultra-violet radiations, the most effective wave-lengths of light which promote the desired oxidation reaction appear to lie in that portion of the spectrum which is below about 3200 Angstrom units, and more particularly in the region of about 2900 to 3000 Angstrom units and below. Since ordinary glass or Pyrex glass will not permit the substantial transmission of these effective light waves, it is preferable to construct the reactor of quartz, calcium fluoride, or the like, or at least provide such containers with openings or windows of such material through which the interior of the reactor may be illuminated with the desired ultra-violet rays. Also, in some instances the source of ultra-violet radiations may be disposed within the reactor and in the path of the reactants, in which case the reactor itself may be constructed of any known material, such as steel, which does not transmit ultra-violet radiations.

Although the volumetric ratios of the organic starting material to the oxygen may vary within relatively wide limits, it may be stated that satisfactory yields of the desired oxygenated product or products can be obtained by using equivolumetric quantities thereof. An increase in the ratio of oxygen to the organic material in the treated mixture may increase the yield of the desired carboxylic acids, organic peroxides and/or ketones. However, any undue increase in this ratio is generally dangerous because of excessive explosion hazards. On the other hand, the use of oxygen to hydrocarbon or oxygen to organic compound ratios which are considerably below equivolumetric will lower the output of the desired product per unit time because of the presence of less oxygen per unit of space. This renders the process less economical, although operable. It must be noted that a lowering of the oxygen to hydrocarbon or oxygen to organic compound ratio may cause a faster consumption of oxygen per unit time. It was stated above that satisfactory yields of the desired oxygenated products may be obtained when equivolumetric mixtures of oxygen and of the specified organic starting material are subjected to the action of hydrogen bromide at the specified operating temperatures. This is particularly true when the oxidation reaction is effected in the presence of the specified catalyst, i. e., of hydrogen bromide, and under the deliberate influence of ultra-violet radiations. Such mixtures usually present no hazards in so far as explosions are concerned, since the hydrogen bromide apparently acts as an explosion retardant or inhibitor, and since the use of ultra-violet rays permits the economical controlled oxidations at temperatures which are considerably below the explosion region.

The amount of hydrogen bromide employed as the catalyst may also vary within relatively wide limits, although optimum amounts or percentages may be readily determined for each individual starting material treated and for the specific operating conditions employed. Generally speaking, the percentage of oxygen which will react to form the oxygenated products will vary with the change in the hydrogen halide concentration in the mixture subjected to treatment. When hydrogen bromide concentration is varied from zero to about 20 per cent there is a proportional and noticeable change in the percentage of oxygen which reacts with the organic starting material. Increases in the volumetric or mol concentration of the hydrogen bromide above about 20%, does not have such a marked effect on the percentage of oxygen which will react. Nevertheless, very high hydrogen bromide concentrations will cause excessive dilution and thus decrease the output of the desired product or products. Such high concentrations should therefore be avoided for economic reasons.

The oxidation in accordance with the present process may be effected at atmospheric pressures, although higher or lower pressures may also be employed. In fact, it is generally preferable to employ super-atmospheric pressures because more of the mixture subjected to treatment may be conveyed through a given unit of reaction space per unit time.

The invention may be executed in a batch, intermittent or continuous manner. When operating in a continuous system, all of the reactants, as well as the diluents, if any of the latter are used, and the catalyst may be first mixed and the mixture may then be conveyed through the whole length of the reaction zone. In the alternative, it is possible to introduce at least a portion of the catalyst and/or of one or both of the reactants, i. e., oxygen and the organic material subjected to oxidation, at various intermediate points along the reaction zone. Such operation may be frequently desirable to control the operating conditions in the reaction zone. Generally, the contact time may vary within relatively wide limits and is at least in part dependent on the other operating conditions such as specific starting material, the ratios thereof to the oxygen and/or the catalyst, the use and intensity of ultra-violet radiations, the presence or absence of inert diluents, the operating temperatures and pressures, etc. In a continuous system it has been found that satisfactory yields of the desired carboxylic acids, organic peroxides and/or ketones may be obtained with contact periods of between about one and about three minutes, although shorter or longer contact times may also be employed.

Instead of using pure or substantially pure oxygen for the oxidation in accordance with the process of the present invention it is also possible to employ oxygen-containing mixtures such as air, or even substances capable of yielding molecular oxygen under the operating conditions. Also, although the examples presented hereinbelow are directed specifically to the use of hydrogen bromide as the catalyst, the process of the present invention may also be realized by using substances capable of yielding hydrogen bromide under the operating conditions employed.

The invention is illustrated by the following specific examples it being understood that there is no intention to be limited by any details thereof since many variations may be made within the scope of the claimed invention.

*Example I*

The reactor having a volume of about 367 cc. was equipped with a hundred-watt quartz mercury arc lamp which was housed in a quartz container. The reactor was provided with a vapor bath to maintain the reactants at a constant and desired temperature throughout the reaction. A 2:2:1 vaporous mixture of ethane, oxygen, and hydrogen bromide was introduced into the reactor and was illuminated therein by means of the aforesaid mercury arc lamp for a peiod of ten minutes while the temperature was maintained at 195° C. An analysis of the reaction mixture showed that acetic acid was formed in an amount equal to 0.91 milli equivalent; it is to be noted that at the reaction temperature 2.5 milli equivalents of acetic acid would correspond to a 100% oxygen conversion (consumption). Therefore, approximately 26.4% of oxygen was consumed to produce acetic acid. The amount of unrecovered hydrogen bromide was found to be equal to 0.062 milli equivalent; this is the amount of hydrogen bromide which was not titrated in aqueous solution by silver nitrate, and is therefore a rough measure of the organic bromides formed. Since the organic bromides, i. e., ethyl bromide, may be treated in accordance with the present invention to produce hydrogen bromide and acetic acid, the overall yield of acetic acid may therefore be further increased.

*Example II*

A 2:2:1 vaporous mixture of ethane, oxygen and hydrogen bromide was introduced into the reactor mentioned in the previous example, and this mixture was maintained in the reactor at a temperature of 195° C. for a period of twenty-four minutes. In this case, however, the reactants were not subjected to the deliberate influence of ultra-violet radiations. An analysis of the reaction product showed that only 0.40 milli equivalent of acetic acid were formed while 0.045 milli equivalents of hydrogen bromide were unrecovered.

A comparison of the results obtained in the above two runs clearly shows the benefits derived for effecting the oxidation reaction under the deliberate influence of ultra-violet rays, i. e., those having wave-lengths of below about 2900 to 3000 Angstrom units. Thus, although the residence time was increased by about 240% the yield of acetic acid in the run effected in the dark, i. e., in the absence of ultra-violet rays, was only equal to about 44% of that formed when the reaction was effected in the presence of hydrogen bromide catalyst and under the deliberate influence of ultra-violet rays. It is to be noted that no oxidation of ethane occurred when the interaction between ethane and oxygen was attempted in the absence of hydrogen bromide and of ultra-violet rays, even when the temperature of the ethane-oxygen mixture was raised to above 300° C., thus clearly showing the advantages derived from the use of a hydrogen halide, such as hydrogen bromide, as a catalyst for the controlled oxidation of the specified organic compounds.

*Example III*

The run described in Example I was repeated in the same apparatus and under the same conditions except for the fact that the reaction temperature was maintained at 170° C. and the residence time (during which the reactants were subjected to ultra-violet radiations emanating from the mercury arc lamp) was equal to about twenty-seven minutes. It was found that 0.79 milli equivalent of acetic acid were formed and that the amount of unrecovered hydrogen bromide was equal to about 0.060 milli equivalent.

*Example IV*

A gaseous mixture consisting of two parts of ethane, two parts of oxygen, 0.5 part of hydrogen bromide and 0.5 part of nitrogen was introduced into the above-described reactor. The reaction mixture was maintained for a period of eighteen minutes at a temperature of 195° C., and was illuminated in the reactor by rays emanating from the mentioned mercury arc lamp. It was found that 0.91 milli equivalents of acetic acid were formed and that 0.053 milli equivalent of hydrogen bromide were unrecovered.

*Example V*

The gaseous mixture subjected to oxidation consisted of 4.5 parts of ethane, 4.5 parts of oxygen and 0.5 part of hydrogen bromide. This mixture was introduced into the same reactor as the one used in the previous examples and was subjected therein, at a temperature of 195° C. and for a period of sixteen minutes, to the above-mentioned ultra-violet radiations. An analysis of the reaction mixture showed that 0.94 milli equivalent of acetic acid were formed and that the amount of unrecovered hydrogen bromide was equal to 0.048 milli equivalent.

A comparison of the above results indicates that the overall conversion of ethane to acetic acid is much more rapid when effected under the deliberate influence of ultra-violet radiations even when the process is effected at temperatures which are considerably below those employed for the oxidation in the absence of such illumination. Also, the conversion is more rapid even in the case when the hydrogen bromide concentration is lower by as much as 50% while the hydrogen bromide recovery is about the same both in the runs effected in the presence and in the absence of ultra-violet radiations. It is also seen that the presence of hydrogen bromide catalyzes the oxidation reaction to produce oxygenated products having the same number of carbon atoms per molecule as the organic starting material so that the reaction may be effected at temperatures which are below the explosion region and which are considerably below the temperatures necessary for the combustion of the starting material if the reaction were to be effected in the absence of the hydrogen bromide, i. e., in accordance with the prior art processes.

Although, the process of the present invention has been particularly illustrated with reference to the oxidation of saturated alkyl hydrocarbons, and particularly of ethane, it can also be applied to the treatment of the other organic compounds described above.

The term "ketone" as employed herein refers to organic compounds having one or more ketonic carbonyl groups. For instance, the oxidation of n-butane in accordance with the process of the invention produces both methyl ethyl ketone and diacetyl, a diketone.

We claim as our invention:

1. A process for the production of acetic acid which comprises subjecting a substantially equivolumetric mixture of ethane and oxygen at substantially atmospheric pressure and at a temperature of about 200° C. to the action of hydrogen bromide employed in an amount in excess of about 20 mol per cent, effecting said reaction under the deliberate influence of ultra-violet rays having wave-lengths below 3000 Angstrom units for a period of time sufficient to effect the controlled catalytic oxidation of the ethane, and recovering acetic acid from the reaction mixture thus formed.

2. A process for the production of acetic acid which comprises subjecting a substantially equivolumetric mixture of ethane and oxygen at substantially atmospheric pressure and at a temperature of about 200° C. to the action of hydrogen bromide and to the deliberate influence of ultra-violet rays having wave-lengths below 3000 Angstrom units for a period of time sufficient to effect the controlled catalytic oxidation of the ethane, and recovering acetic acid from the reaction mixture thus formed.

3. A process for the production of acetic acid which comprises reacting ethane and oxygen in the presence of hydrogen bromide and at a temperature of between about 100° C. and about 200° C., effecting the reaction under the deliberate influence of ultra-violet rays having wave-lengths below 3000 Angstrom units, continuing the reaction for a period of time sufficient to cause the controlled catalytic oxidation of ethane, and recovering acetic acid from the reaction mixture thus formed.

4. A process for the production of acetic acid which comprises subjecting ethane, oxygen and hydrogen bromide, at an elevated temperature which is below that at which spontaneous combustion occurs, to the deliberate influence of ultra-violet rays having wave-lengths below 3000 Angstrom units, effecting the reaction for a period of time sufficient to cause the controlled oxidation of the ethane, and recovering acetic acid from the reaction mixture thus formed.

5. In a process for the production of oxygenated organic products, the steps of subjecting vapors of a saturated aliphatic hydrocarbon having at least two carbon atoms per molecule to the action of oxygen in the presence of hydrogen bromide and under the deliberate influence of ultra-violet rays having wave-lengths below 3000 Angstrom units, and effecting the reaction at an elevated temperature of between about 100° C. and the temperature at which spontaneous combustion will occur.

6. The process according to claim 5 wherein the saturated aliphatic hydrocarbons and the oxygen are employed in substantially equivolumetric proportions.

7. The process according to claim 5 wherein an inert diluent is employed as a carrier to maintain the reactants in the vapor state.

8. In a process for the controlled oxidation of aliphatic hydrocarbons, the steps of subjecting vapors of a saturated aliphatic hydrocarbon to the action of oxygen in the presence of hydrogen bromide, under the deliberate influence of ultra-violet rays having wave-lengths below 3000 Angstrom units and at an elevated temperature which is below that at which spontaneous combustions will occur, and continuing said reaction for a period of time sufficient to effect a substantial reaction between the saturated aliphatic hydrocarbons and the oxygen.

9. In a process for the production of oxygenated organic products, the steps of subjecting vapors of an alkylated aromatic hydrocarbon to the action of oxygen in the presence of hydrogen bromide, under the deliberate influence of ultra-violet rays having wave-lengths below 3000 Angstrom units and at an elevated temperature which is below the spontaneous combustion temperature of the mixture, and continuing said reaction for a period of time sufficient to effect a substantial reaction between said alkylated aromatic hydrocarbon and the oxygen.

10. In a process for the controlled oxidation of alicyclic hydrocarbons, the steps of subjecting vapors of an alicyclic hydrocarbon to the action of oxygen in the presence of hydrogen bromide, under the deliberate influence of ultra-violet rays having wave-lengths below 3000 Angstrom units and an elevated temperature which is below that at which spontaneous combustion will occur, and continuing said reaction for a period of time sufficient to effect a substantial reaction between said alicyclic hydrocarbon and the oxygen.

11. In a process for the controlled oxidation to produce oxygenated organic compounds predominating in compounds containing the same number of carbon atoms per molecule as the starting organic material, the step of subjecting the vapors of an organic compound having at least one replaceable hydrogen atom to the action of oxygen, in the presence of hydrogen bromide, under the deliberate influence of ultra-violet rays having wave-lengths below 3000 Angstrom units, and at an elevated temperature which is below that at which spontaneous combustion and the resultant decomposition of the carbon structure of the starting organic compound occurs.

12. In a process for the controlled oxidation of organic compounds, the step of subjecting an organic compound containing at least one replaceable hydrogen atom to the action of oxygen and of hydrogen bromide, under the deliberate influence of ultra-violet radiations and at an elevated temperature below that at which spontaneous combustion and the resultant decomposition of the carbon structure of the starting organic compound occurs.

13. In a process for the controlled oxidation of organic compounds, the steps of subjecting an organic compound containing at least one replaceable hydrogen atom to the action of oxygen, in the presence of hydrogen bromide, and effecting the reaction under the deliberate influence of photo-chemically active radiations and at an elevated temperature below that at which spontaneous combustion of the mixture occurs.

FREDERICK F. RUST.
WILLIAM E. VAUGHAN.

REFERENCES CITED

The following references are of record in the file of this patent:

UNITED STATES PATENTS

| Number | Name | Date |
| --- | --- | --- |
| 1,678,403 | Martin | July 24, 1928 |
| 1,741,305 | Jaegar | Dec. 31, 1929 |
| 2,003,303 | Mitscherling | June 4, 1935 |
| 2,104,760 | Renfrew | Jan. 11, 1938 |
| 1,988,529 | Werntz | Jan. 22, 1935 |
| 2,115,206 | Milas | Apr. 26, 1938 |
| 2,138,868 | Liberthson | Dec. 6, 1938 |
| 2,149,465 | Goos et al. | Mar. 7, 1939 |
| 2,243,053 | Ramage | May 20, 1941 |
| 2,321,823 | Kirkbride | June 15, 1943 |
| 1,924,763 | Carpenter | Aug. 20, 1933 |
| 2,369,181 | Rust et al. | Feb. 13, 1945 |